(12) United States Patent
Ackley

(10) Patent No.: US 8,810,369 B2
(45) Date of Patent: *Aug. 19, 2014

(54) FINDING SENSOR DATA IN AN RFID NETWORK

(75) Inventor: H. Sprague Ackley, Seattle, WA (US)

(73) Assignee: Intermec IP Corp, Everett, WA (US)

( * ) Notice: Subject to any disclaimer, the term of this patent is extended or adjusted under 35 U.S.C. 154(b) by 505 days.

This patent is subject to a terminal disclaimer.

(21) Appl. No.: 12/619,228

(22) Filed: Nov. 16, 2009

(65) Prior Publication Data

US 2010/0188197 A1    Jul. 29, 2010

Related U.S. Application Data

(60) Provisional application No. 61/116,154, filed on Nov. 19, 2008.

(51) Int. Cl.
*H04Q 5/22* (2006.01)
*H04Q 9/00* (2006.01)

(52) U.S. Cl.
CPC ............. *H04Q 9/00* (2013.01); *H04Q 2209/47* (2013.01); *H04Q 2209/75* (2013.01)
USPC ....... 340/10.1; 340/572.1; 235/454; 235/470; 235/462.01

(58) Field of Classification Search
USPC ............. 340/10.1, 10.2, 572.1; 235/375, 385, 235/435, 440, 454, 470, 449, 462.01, 235/462.13
See application file for complete search history.

(56) References Cited

U.S. PATENT DOCUMENTS

| | | | |
|---|---|---|---|
| 6,321,986 B1* | 11/2001 | Ackley ..................... | 235/462.01 |
| 6,677,852 B1* | 1/2004 | Landt ........................... | 340/10.1 |
| 2004/0025035 A1* | 2/2004 | Jean-Claude et al. ........ | 713/189 |
| 2006/0187031 A1* | 8/2006 | Moretti et al. ........... | 340/539.22 |
| 2008/0011822 A1 | 1/2008 | Ackley | |
| 2008/0030330 A1* | 2/2008 | Vock et al. ................. | 340/568.1 |

* cited by examiner

*Primary Examiner* — Brian Zimmerman
*Assistant Examiner* — An T Nguyen
(74) *Attorney, Agent, or Firm* — Kinney & Lange, P.A.

(57) ABSTRACT

A system and method of selectively reading sensor data from a memory device is able to search the memory device for an indicator that identifies the sensor data, and read only the sensor data identified by the indicator from the memory device. In this way, interrogating devices are able to sort through sensor data stored in a network of memory devices, such as an RFID network, and report specific data of interest despite the existence of a variety of data types in the network. In some embodiments, flags are stored and associated with specific types of data, such as various sensor data, thereby allowing numerous memory devices and sensors to operate and be read efficiently in the same environment.

5 Claims, 3 Drawing Sheets

[RFID_tag_ID]
[Flag_1.1]
[Time_1] (optional)
[Data_from_sensor_1]
[Flag_1.2]
[Time_2] (optional)
[Data_from_sensor_1]
[Flag_2.1]
[Time_2] (optional)
[Data_from_sensor_2]
. . .

FIG. 2

FINDING SENSOR DATA IN AN RFID NETWORK

CROSS-REFERENCE TO RELATED APPLICATION(S)

This application claims the benefit of U.S. Provisional Application No. 61/116,154 filed Nov. 19, 2008 for "FINDING SENSOR DATA IN AN RFID NETWORK" by H. S. Ackley.

INCORPORATION BY REFERENCE

U.S. Provisional Application No. 61/116,154 is hereby incorporated by reference herein in its entirety.

BACKGROUND

The present invention relates to acquisition of data from RFID tags, and more specifically to a direct and efficient method of sorting through data stored in RFID tags to acquire and/or act on desired types of data, such as stored sensor data, among many different types of data available.

In many modern applications, data associated with an item, location, or both is stored in a local memory device such as a radio frequency identification (RFID) tag, so that the stored data may be accessed by a memory reader for various purposes. According to existing methods, an interrogating device reads all data associated with a memory device being interrogated, regardless of its type, and through appropriate software the acquired data is analyzed and sorted to extract the data that matches the type of data that the interrogating device was looking for. These methods do not provide the capability to selectively acquire only data of the type that is needed, which results in a waste of time and other resources in the process of acquiring data from memory devices.

SUMMARY

A system and method of selectively reading sensor data from a memory device is able to search the memory device for an indicator that identifies the sensor data, and read only the sensor data identified by the indicator from the memory device. In this way, interrogating devices are able to sort through sensor data stored in a network of memory devices, such as an RFID network, and report specific data of interest despite the existence of a variety of data types in the network. In some embodiments, flags are stored and associated with specific types of data, such as various sensor data, thereby allowing numerous memory devices and sensors to operate and be read efficiently in the same environment.

BRIEF DESCRIPTION OF THE DRAWINGS

FIG. 2 is a diagram illustrating an exemplary embodiment of the layout of flags and data from various sensors in an RFID tag.

DETAILED DESCRIPTION

Figure 1:
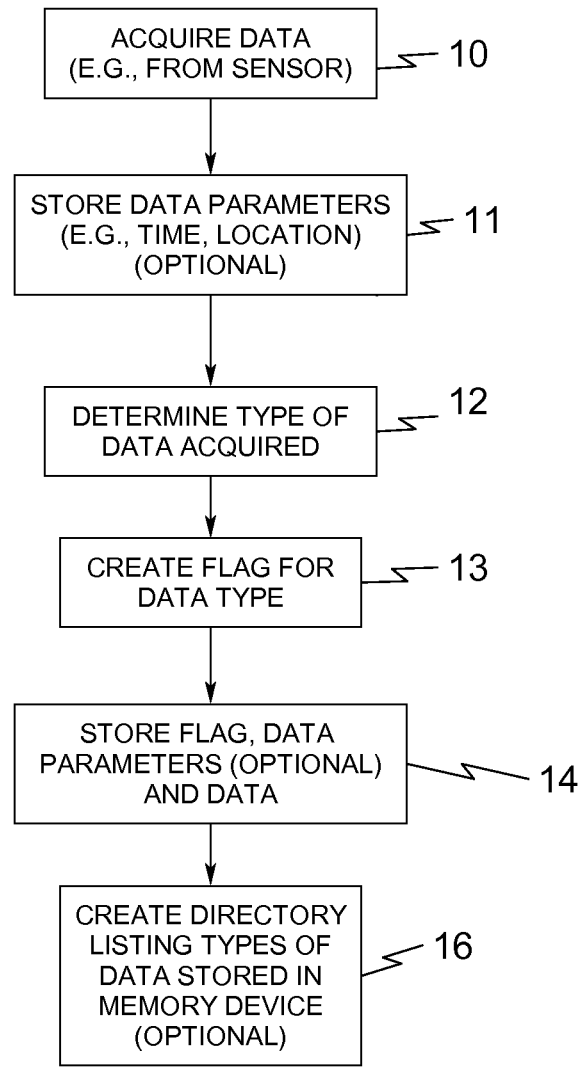
FIG. 1 is a flow diagram illustrating a method of storing data in a memory device that allows selective acquisition by data type.

FIG. 1 is a flow diagram illustrating a method of storing data in a memory device that allows selective reading of data by data type. Initially, data is acquired (step 10) by one of a number of possible methods. For example, data may be acquired by operation of a sensor that records signals related to a physical parameter of some kind, such as temperature, humidity, or others, or may be acquired by input from a user interface device, a transmission from a programming device, or by any of a number of other means. Certain data parameters may optionally also be acquired with the data (step 11), such as time, location, warning information such as a hazardous material warning, or other parameters related to the data acquired. Next, the type of data acquired is determined (step 12). The type of data may be determined by receiving an indicator flag of some sort along with the data when it is acquired, by reading a header received before the data is acquired that indicates what type of data will follow, by examining the characteristics of the data, or by other methods. A flag is then created for the type of data acquired (step 13), to uniquely identify the type of data acquired. The data is then stored in the memory device with the flag indicating its type, any data parameters associated with the data, and the data itself (step 14). A directory may also be created (step 16) listing the types of data that are stored in the memory device, so that an interrogator can be apprised of the data types that are stored in the memory device and the names of those data types.

FIG. 2 is a diagram illustrating an exemplary embodiment of the layout of flags and data from various sensors in an RFID tag. At a given time, the tag records data from a sensor and uses an encoding method to encode a flag that indicates, for example, "what follows is sensor data." In the example shown in FIG. 2, this flag is entitled "Flag_1.1." Optionally, a time stamp (shown as "Time_1" in FIG. 2), GPS location, or other sequential information may be stored with the flagged sensor data (shown as "Data_from_sensor_1" in FIG. 2). Later, another reading from the same sensor (shown as a second occurrence of "Data_from_sensor_1") can be stored on the same tag using another flag (shown as "Flag_1.2") and optionally a time stamp (shown as "Time_2"), GPS location or other sequential information. In the example shown in FIG. 2, data from a second sensor (shown as "Data_from_sensor_2") is recorded at a second time ("Time_2"), but is stored on the tag with a different flag ("Flag_2.1") to indicate that the data came from a different sensor. The flag may be an inherent part of the tag encoding method, an out-of-channel identifier such as extended channel information (ECI) data, a modified function character or a predefined string of ASCII characters, or another type of identifier. The flag and optional sequential information need not be in a series as indicated in the example shown in FIG. 2, but my alternatively be in a grouping where all the flags are stored together in sequence followed by the data elements from the sensor(s), for example.

Figure 3:
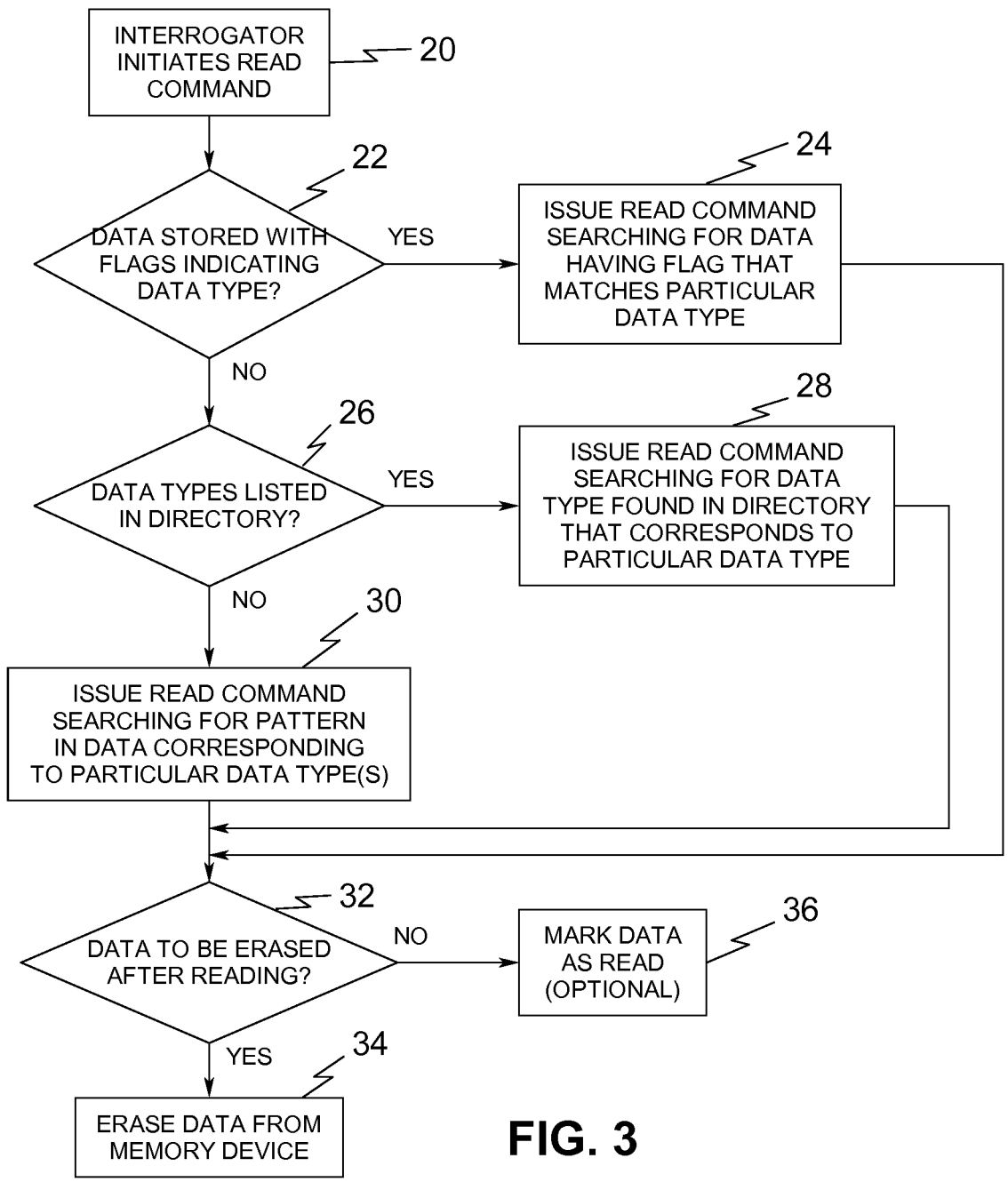
FIG. 3 is a flow diagram illustrating a method of interrogating a memory device in order to selectively read data by data type.

FIG. 3 is a flow diagram illustrating a method of interrogating a memory device in order to selectively acquire data by data type. Initially, an interrogator (such as an RFID reader or another type of device) initiates a read command (step 20). Within the scope of the system and method described herein, there are a number of options for the read command, all involving searching the memory device for an indicator that identifies sensor data. For example, data may be stored with flags indicating the data type, and the interrogator may know what the flags are (indicated by decision step 22). If the interrogator knows the flags stored in the memory device that indicate data type, then a read command is issued searching for data having a flag that matches the particular data type (i.e., sensor data of some kind) for which the interrogator is looking (step 24). If the interrogator does not already know the flags stored in the memory device, the interrogator next determines whether data types are listed in a directory stored by the memory device (decision step 26). If there is a directory of data types stored in the memory, device, a read command is issued searching for a data type listed in the directory that corresponds to the particular data type for which the interrogator is looking (step 28). If no data types are listed in a directory, the interrogator issues a read command that searches for a data pattern that corresponds to the particular data type for which the interrogator is looking (step 30). After reading data, as indicated by decision step 32, the interrogator may erase the data that was read (step 34) or mark the data as having been read (step 36), indicated by decision step 32.

An example of an application in which the above-described methods may be used will now be described. An RFID network may be employed in which multiple items are present, each item having one or more RFID tags associated therewith. In an exemplary scenario, it is desirable to identify specific sensor data stored in the RFID tags. An interrogator issues read commands to the RFID tags, finding only the data that is needed and returning this data despite the existence of multiple RFID tags that contain data of many varieties. In one embodiment, the read command may access specific sensor data such as "temperature" (matching a flag associated with the data that indicates it is temperature data). In another embodiment, the interrogator may access a directory stored in each RFID tag that contains the types of sensor data that are present on the tag.

The read command may be more complex in some embodiments, accessing particular subsets of sensor data such as "temperature data from May 1 to May 6" for example. The interrogator may issue a read command only to tags that have both temperature and humidity data, for example, and not just one or the other. The interrogator may query tags that have sensor data and have data encoded according to a particular standard, such as ISO or EPCglobal. The interrogator may access only sensor data associated with hazardous material information. Other combinations and variations are also possible.

The system and method described above may be implemented by, or used in conjunction with, the out-of-channel methods disclosed in U.S. Patent Application Publication No. 2008/0011822 A1, which is incorporated by reference herein. For example, the system and method described above may employ an out-of-channel command to capture sensor data and initiate the data acquisition and storage method described in FIG. 1, or may execute an out-of-channel command to store a flag associated with certain data in a separate memory device or portion of the memory device, or may involve a combination or modification of these out-of-channel methods.

The system and method described above allows for the storage of multiple sensor data elements in a single memory device or in multiple memory devices, and allows an interrogator to efficiently sort through sensor data stored in a network of one or more memory devices, such as an RFID network. The storage and interrogation system is able to report the specific data of interest despite the existence of a variety of data types on the one or more memory devices in the network.

Although the present invention has been described with reference to preferred embodiments, workers skilled in the art will recognize that changes may be made in form and detail without departing from the spirit and scope of the invention.

The invention claimed is:

1. A method of operating an automatic data collection system, comprising:
    extracting a command encoded in a first machine-readable data carrier, wherein extracting the command comprises reading the first machine-readable data carrier and interpreting an extended channel portion of the first machine-readable data carrier;
    associating the command with sensor data of a second machine-readable data carrier identified by data encoded in the first machine-readable data carrier; and
    directing an RFID tag reader to execute the command encoded in the first machine-readable data carrier, by searching the second machine-readable data carrier for an indicator that identifies a directory of data types, searching the directory of data types for data that corresponds to the sensor data, and reading only the sensor data indicated in the directory of data types from the second machine-readable data carrier.

2. The method of claim 1, wherein the first machine-readable data carrier comprises a machine-readable symbol, and extracting the command comprises reading the machine-readable symbol and interpreting the extended-channel portion of the machine-readable symbol.

3. The method of claim 2, wherein the machine-readable symbol is a bar code.

4. The method of claim 1, wherein the second machine-readable data carrier is an RFID tag.

5. The method of claim 1, wherein the command is embedded in a character in the extended-channel portion.

* * * * *